United States Patent [19]

Nagy, Jr. et al.

[11] Patent Number: 4,539,547
[45] Date of Patent: Sep. 3, 1985

[54] LOW LIQUID LEVEL SENSING AND WARNING CIRCUIT

[75] Inventors: George Nagy, Jr., Canton; Clement W. Rowan, Livonia, both of Mich.

[73] Assignee: Ford Motor Company, Dearborn, Mich.

[21] Appl. No.: 488,465

[22] Filed: Apr. 25, 1983

[51] Int. Cl.³ .............................................. B60Q 1/00
[52] U.S. Cl. ........................................ 340/59; 73/308;
 73/313; 340/623
[58] Field of Search ................ 340/59, 620, 622, 644,
 340/653, 618, 623, 52 F; 361/195, 166;
 307/118; 73/305, 308, 313

[56] References Cited

U.S. PATENT DOCUMENTS

| | | | |
|---|---|---|---|
| 1,280,222 | 11/1918 | Hester . | |
| 1,768,446 | 6/1930 | Gron . | |
| 2,700,153 | 1/1955 | Huckabee | 340/59 |
| 2,766,406 | 10/1956 | Schwarzkopf | 340/522 |
| 3,196,389 | 7/1965 | Heidner | 340/52 F |
| 3,601,793 | 8/1971 | Otta | 340/59 |
| 3,605,086 | 9/1971 | Triska | 340/59 |
| 3,711,827 | 1/1973 | Houseman | 340/52 F |
| 3,787,733 | 1/1974 | Peters | 340/620 |
| 3,939,470 | 2/1976 | Arai et al. | 340/59 |
| 4,023,137 | 5/1977 | Olsbo et al. | 340/59 |

Primary Examiner—John W. Caldwell, Sr.
Assistant Examiner—Ellwood G. Harding
Attorney, Agent, or Firm—Paul K. Godwin, Jr.; Robert D. Sanborn

[57] ABSTRACT

A circuit for sampling the conditions of a liquid level sensor for a short period of time after the circuit is turned on and energizing a warning indicator for an initial check-out period that is followed by continuous energization in the event the sensor indicates a low liquid level condition during the sampling period.

4 Claims, 1 Drawing Figure

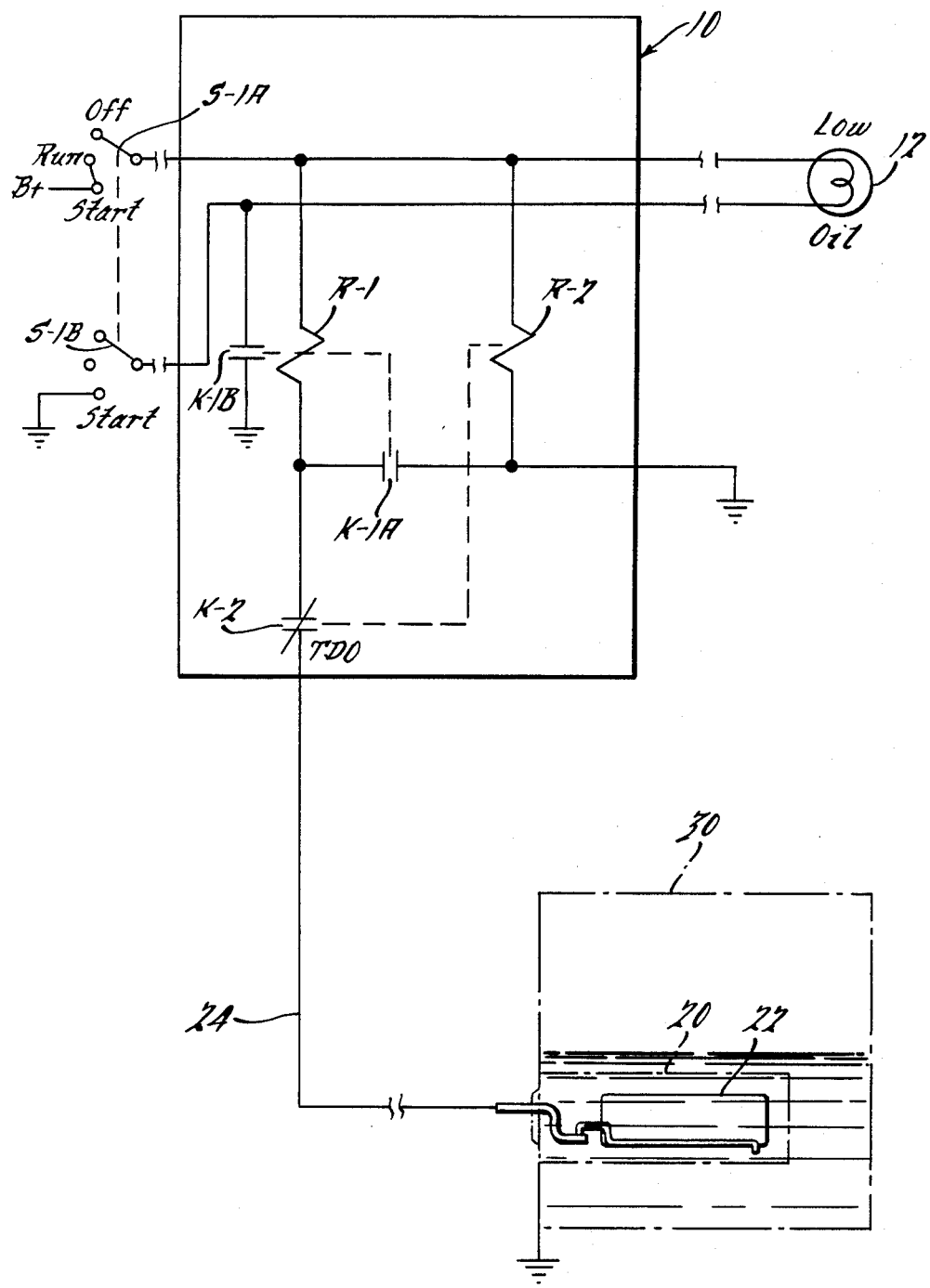

LOW LIQUID LEVEL SENSING AND WARNING CIRCUIT

RELATED APPLICATION

The present invention is related to commonly-assigned U.S. Pat. No. 4,467,156.

BACKGROUND OF THE INVENTION

1. Field of the Invention

The present invention is directed to the field of liquid level sensing and more particularly to the area of circuitry configured to sense the occurrence of low liquid levels and provide warning indications of such occurrences.

2. Description of the Prior Art

Many circuits have been utilized, in conjunction with liquid level sensors, to supply indication when liquid level is above or below a predetermined level. Some such level monitoring systems have been proposed for automotive use in order to measure the level of oil in the crankcase of an associated engine. U.S. Pat. No. 1,280,222; No. 3,605,086; and No. 3,939,470 describe circuits that continuously monitor the oil level during operation of the associated engine. A system has been proposed in U.S. Pat. No. 1,768,446 which incorporates manually actuated switches so that the operator may from time-to-time check to see if the oil level is below a critical level.

SUMMARY OF THE INVENTION

The present invention is intended to provide an automatic liquid level sensing circuit which samples the condition of an associated liquid level sensor for a predetermined period of time during the start cycle of the engine. The circuit operates in conjunction with a warning lamp and latches the warning light to a continuously energized mode in the event a low oil level is sensed during that sampling period. Sampling is only made during that initial start period, since the oil is subsequently pumped from the reservoir to lubricate the various moving mechanical parts of the engine and therefore lowers the level from its true at-rest level. The circuit also provides a lamp check feature, whereby the lamp is always energized during the start cycle without regard to the condition of the sensor.

BRIEF DESCRIPTION OF THE DRAWING

The FIGURE is a schematic of a preferred embodiment of the present invention.

DETAILED DESCRIPTION OF THE PREFERRED EMBODIMENT

The present invention is shown in the FIGURE as a circuit 10, connected to sense the engine oil level of an associated vehicle engine within a reservoir 30. A float sensor 20, such as disclosed in the above-identified commonly assigned application, is connected to the reservoir 30 and provides an electrical ground through float 22 for a sensing line 24 if the liquid level within the reservoir 30 falls below a predetermined level. Otherwise, the float 22 provides an open (ungrounded) circuit for sensing line 24.

The circuit 10 includes a first voltage responsive switch in the form of a relay coil R-1 having one end connected to a first portion of an ignition switch designated S-1A and its other end connected through a normally closed switch, in the form of relay contacts K-2, to the sensing line 24. The normally closed relay contacts K-2 are controlled to be opened after a predetermined time delay by a second voltage responsive switch in the form of relay coil R-2 connected between ignition switch S-1A and ground.

A low oil alarm lamp 12 is remotely located from the circuit 10 at a point where the operator may readily view it when it is energized. The two filament leads of the lamp 12 are respectively connected through the circuit 10 to ignition switch S-1A and to a second portion of the ignition switch designated S-1B. That filament lead, of the low oil warning lamp 12 connected to ignition switch S-1B, is also connected to a normally open switch in the form of relay contacts K-1B that are controlled for closing by an energized relay coil R-1. Energized relay coil R-1 also controls the closing of normally open switching contacts K-1A, which are connected between ground and the junction between the relay coil R-1 and relay contacts K-2 to provide a latched ground path for the relay coil R-1 when it is energized.

The ignition switch S-1A is shown as having three positions: OFF, RUN, and START. In the RUN and START positions, the ignition switch S-1A provides a B+ power supply voltage to the circuit 10. In the START position, the ignition switch S-1B supplies a ground to the circuit 10.

In operation, when the ignition switch S-1A and S-1B is positioned in the START position, the low oil warning lamp 12 is energized by the power supply B+ applied across it through the ignition switch S-1A and S-1B. This serves as a lamp check to indicate that the lamp 12 is functioning. At that time, the relay coil R-2 is also energized and commences a time delay period, that in this instance was selected as 1 second, prior to opening the normally closed relay contacts K-2. If during that period of time delay, prior to relay coil R-2 opening the relay contacts K-2, the liquid level within the reservoir 30 is below the predetermined level that causes the sensor switch 20 to provide a ground path for sensing line 24, relay coil R-1 is also energized and immediately closes relay contacts K-1A and K-1B. The closing of relay contacts K-1A provides a latching that holds the relay coil R-1 in a continuously energized state even after the relay contacts K-2 are opened by relay coil R-2. The closing of relay contacts K-1B provide for a continuous energization path for the low oil warning lamp 12 even after the ignition switch S-1A and S-1B is repositioned to the RUN position after the engine has been started. In that manner, the low oil level sensed during the initial sampling period during start up will be continuously indicated by the energization of the low oil lamp 12 until the ignition switch is turned to the OFF position.

It will be readily apparent that many modifications and variations may be implemented without departing from the scope of the novel concept of this invention. Therefore, it is intended by the appended claims to cover all such modifications and variations which fall within the true spirit and scope of the invention.

We claim:

1. A circuit connected to a liquid level sensor that is in an electrically grounded condition when sensed liquid is below a predetermined level including:

a source of electrical potential;

means connected to said potential source for warning that said liquid is below said predetermined level;

first means connected between said source of electrical potential and said liquid level sensor for reactively latching a conductive electrical path to ground for said warning means and thereby placing said warning means in an activated condition, when said sensor is in a grounded condition and said electrical potential is applied from said source; and second means connected between said source of said electrical potential and ground for reactively interrupting the connection between said first reactive means and said sensor following a predetermined period of time after activation by said source of electrical potential.

2. A circuit as in claim 1, wherein said level warning means is a filament lamp connected to said source of electrical potential and said first reactive means and said lamp is energized for illumination whenever said electrical path is latched to ground.

3. A low liquid level sensor circuit for use in combination with a source of electrical potential;
switch means between said circuit and said electrical potential source for providing application of said electrical potential to said circuit; and
an electrical switch type liquid level sensor mounted in a liquid container and connected to said circuit to open an electrical ground path when sensed liquid surrounding said sensor is above a predetermined level and to close an electrical ground path when said liquid is below said predetermined level; said circuit comprises:

timing means connected between said switch means and ground for disconnecting said sensor from said circuit after a predetermined period of time following the application of said potential to said circuit by said switch means;
warning means connected to said switch means for providing a humanly perceivable warning when said sensor provides a closed ground path during said predetermined period of time; and
means connected between said switch means and said sensor during said predetermined period of time for closing a separate ground path to said warning means in the event said sensor provides a closed ground path during said predetermined period of time and in such event, holding said separate ground path closed until said switch means ceases application of said electrical potential.

4. A low liquid level sensor circuit as in claim 3, utilized in conjunction with an internal combustion engine, whereby said sensor is mounted in the crankcase of said engine to monitor the level of lubrication oil therein and said predetermined period of time as on the order of one second.

* * * * *